Dec. 27, 1938.   R. J. H. HUDSON   2,141,534
FOLDING STRUCTURAL ARRANGEMENT OF AIRCRAFT
Filed Oct. 6, 1937   3 Sheets-Sheet 1

Inventor,
Richard J. H. Hudson

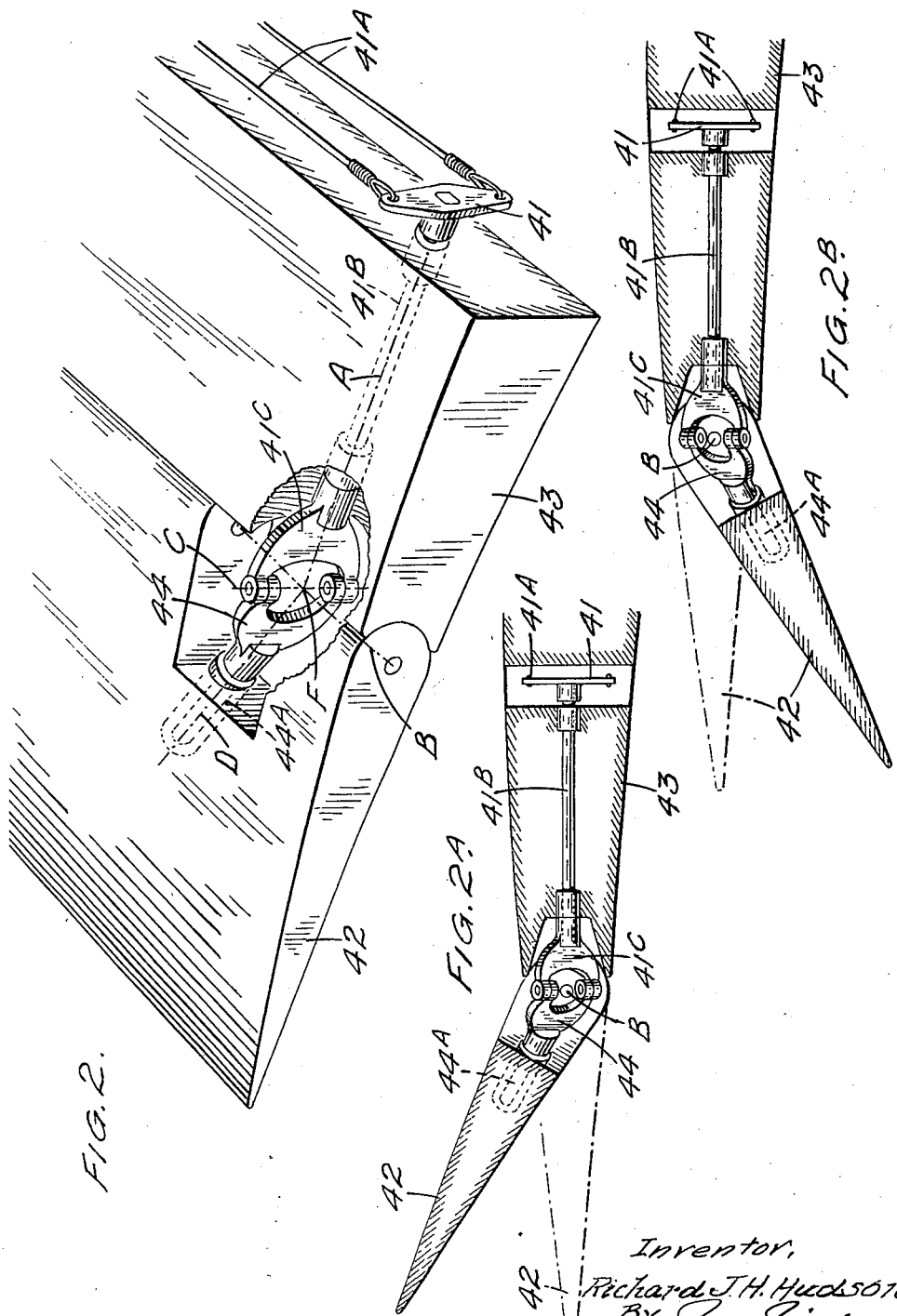

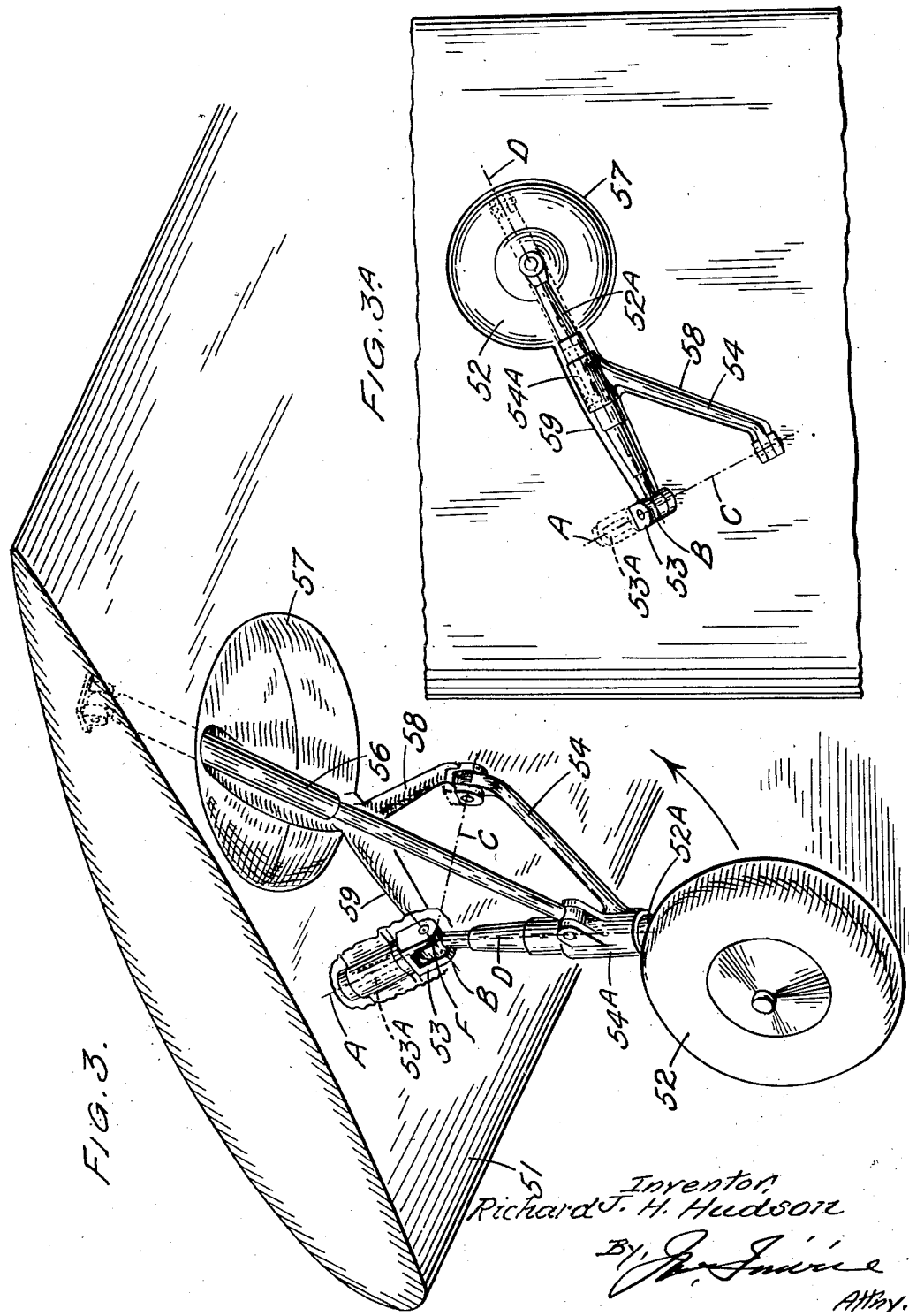

Patented Dec. 27, 1938

2,141,534

UNITED STATES PATENT OFFICE 2,141,534

FOLDING STRUCTURAL ARRANGEMENT OF AIRCRAFT

Richard John Harrington Hudson, Dousland, South Devon, England

Application October 6, 1937, Serial No. 167,662
In Great Britain October 9, 1936

18 Claims. (Cl. 244—49)

This invention relates to folding structural arrangements of aircraft. Reference will be made to frames; this term is used to denote parts or components which are in the nature of space frames, e. g. complete aerofoils, control surfaces, plane frames forming parts of undercarriage structures, inspection panels, or the like. Although for the sake of convenience such elements will be regarded as if they lie in single planes, it will of course be appreciated that they must necessarily have thickness and may have curvature or irregularity of shape, but in general it will be readily understood that the plane of an element or frame refers to the general plane which it occupies. A primary object of the invention is the provision of an arrangement for effecting or controlling angular movement of one or more frames for folding or changing their position, or retracting or extending, or operation as a control e. g. an aileron or flap. One typical case relates to the folding of wings; another to the retraction of an undercarriage, but further applications will readily be envisaged. The invention may also provide for some degree of locking or non-returnability of a frame when in an operative position. Other advantages become apparent in relation to particular applications; for example, in relation to wings, the invention may permit relatively small angular adjustments, for example of incidence or dihedral angle. The same principles are applied in means for causing angular movement of a frame, e. g. an aileron, as for permitting and controlling such movement, e. g. in wing folding.

In designing joints, folding means, control connections and the like for aircraft, one of the chief considerations which has to be borne in mind is compactness, another is lightness with strength, and in some cases e. g. wing folding and undercarriage retraction, rigidity in the operative position, so as to render a structure more or less self-locking against external loads, is an advantage. The invention in its various manifestations provides one or more of these attributes. The underlying idea of the invention consists in the interconnection of parts which are required to be moved in composite relative directions through the medium of at least four axes which meet at a point and which have various relative inclinations according to the function to be performed. The members correlated by these axes may be employed merely as movement constraining members, e. g. as in wing folding, or they may be provided so as to achieve a particular final position as in the case of an undercarriage, or they may form a movement transmission system as in the case of the connection to a control surface, e. g. aileron.

Figure 2 is a broken perspective view showing the invention applied to an aileron.

Figure 2A is a broken view in side elevation showing the aileron up.

Figure 2B is a view similar to Figure 2A showing the aileron down.

Figure 3 is a perspective view illustrating the invention applied to a retractible undercarriage showing the same extended.

Figure 3A is a plan view of the same showing the undercarriage retracted.

In all the diagrams it will be found that there are four important axes which govern the function of the devices. For universality of reference these will be called A, B, C and D.

Figure 1:
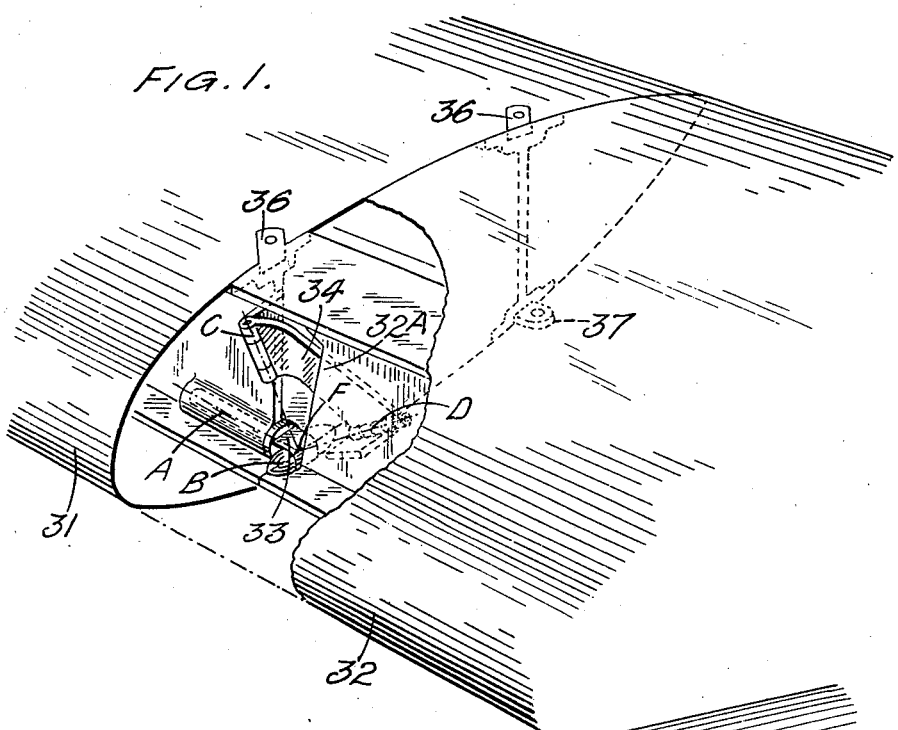
Figure 1 is a broken perspective view illustrating the application of the invention to a cantilever wing showing the same spread.
Figure 1A:
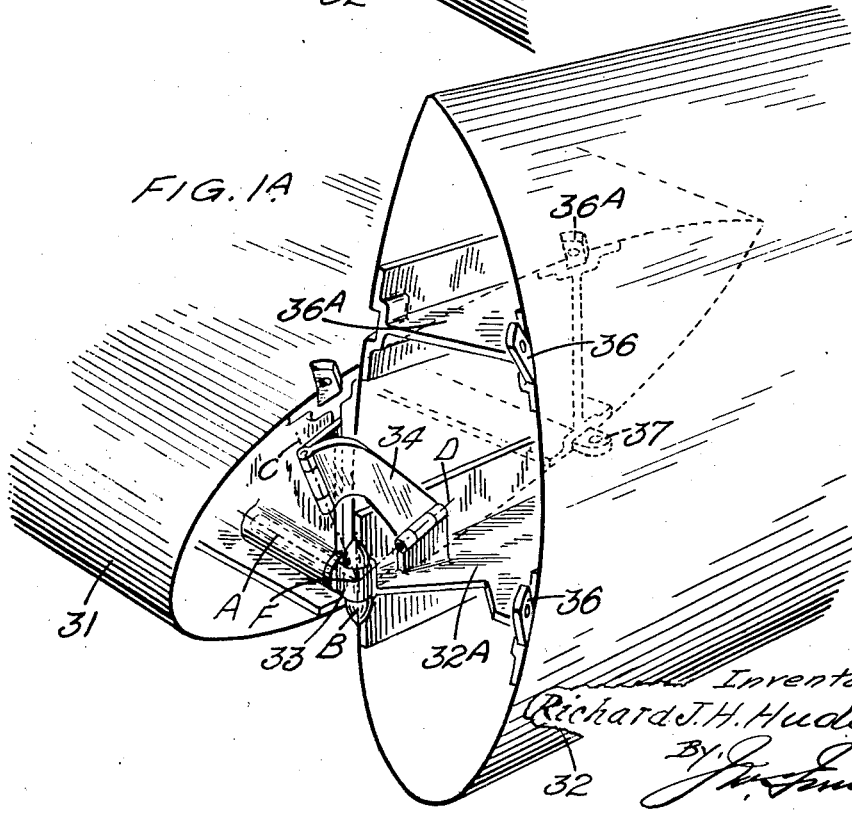
Figure 1A is a similar view showing the parts folded.

In Figures 1 and 1A, the invention is applied to a cantilever wing and is for convenience illustrated as being connected to a stub wing which will not necessarily be present, and which can be replaced simply by a wall of the fuselage. The wing 32 is attached, then, to its anchorage which is in this case the stub 31. It is attached through the medium of a fitting 33 which is rotatably carried on the axis A by the stub 31, and which itself supports a pivot of which the axis is B and which connects it to the wing 32, for example to a front spar 32A of I section as illustrated. Also interconnecting the wing 32 to the stub 31 is a constrainer in the form of a bracket 34 hinged on the axis C to the stub 31, and hinged to the spar 32A on the axis D. It will be understood that the axes A and B are relatively perpendicular, axes C and D nearly relatively perpendicular, all these axes A, B, C, D are relatively inclined, and they all meet at the point F. The movement of the wing from the extended position of Figure 1 to the folded position of Figure 1A, is first a maximum of rotation about a span-wise axis, and finally (the general plane of the wing having been rotated from horizontal to vertical) rotation in the horizontal plane substantially about a vertical axis. Particularly favourable attachments are offered for the wing when spread. The front and rear spars of the wing have lugs 36 projecting from them in a somewhat helically inclined sense, and these enter recesses 36A of the stub 31, holes of the lugs and recesses coming into precise registration, so that locking pins can be inserted. The attachments thus provided are seen to be well spaced chordwise, and further attachments 37 for the spars may be provided at the underside of the wing, the whole of which is particularly robust and convenient. In beginning the movement of folding, the wing not only rotates so as to disengage 36 from 36A, but also retreats from the stub 31, thus quite simply freeing the lugs 36 from the recess 36A.

Turning to Figures 2, 2A and 2B, the invention is seen as applied to an aileron indicated diagrammatically at 42, which is required to be moved angularly in relation to a wing 43 by mechanism connected to the pilot's control. In order to correlate this embodiment of the invention with the others, it is necessary to appreciate that the aileron 42 is in fact required to rotate in two planes relatively to an actuating part 41. The part 41 is formed as a lever connected by cables such as 41A to the pilot's control. The lever 41 is mounted fast on a spindle 41B which has at its rear end a fork (41C). In this case it is necessary to regard the wing 43 as the intermediate member which is rotatable relatively to the part 41 about the axis A, whilst the aileron 42 is pivoted to 43 about the axis B, this being the axis of the ordinary aileron hinge. The second interconnection between 41 and 42 is comprised by the constraining element 44 which is a fork fitting borne by a spindle 44A in a bearing in the aileron 42 and consequently relatively rotatable about the axis D, whilst the constrainer 44 is connected to 41 through the fork 41C, on the axis C. Here again the four important axes are present in the same conditions as in the previous cases. Rotation of the lever 41 by the pilot produces angular movement of the aileron 42, which relative to the movement of 41 is movement in two planes. It will be observed that the mechanism can lie wholly within the thickness of the wing and aileron and by suitably disposing the axes it may be found possible to produce differential effects, already known in connection with ailerons, and it may also be found possible conveniently to damp aileron movement by the use of quite a weak frictional or other brake about one or other of the axes, the selecting being made in accordance with the mechanical advantage required. No axial sliding occurs at any bearing.

Referring to Figures 3 and 3A, a retractable undercarriage is shown in which it is required to retract a wheel and wheel-carrying part of a leg substantially rearwardly, whilst rotating its plane for nesting. The undercarriage is mounted beneath a wing 51 and comprises a wheel 52 and wheel-carrying leg part 52A. These are connected to the wing 51 through the intermediary of a forked fitting 53 which is borne in the wing for rotation about the axis A on a spindle 53A, and which supports a pivot of which the axis is B which connects it to the leg 52A. The constraining member in this case is a strut 54 pivotally attached to the wing 51 at axis C, and pivotally attached to the leg 52A by a sleeve 54A which is rigid with the strut 54, and rotatable relative to the leg about the axis D. Any suitable retracting means indicated diagrammatically by the jack 56 is attached preferably between the sleeve 54A and the wing 51 by pivots. A nesting recess 57 is provided for the wheel, recess 58 for the strut 54, and recess 59 for the leg 52A. The inclination of axis A to axis D causes leg 52 to rotate about axis D when the frame constituted by 52A, 54, is swung upwardly and rearwardly about the axis C.

In all the above embodiments, the feature will be noted, that axes A and B are of pivot or hinged attachment between the two parts required to be angularly moved in two planes; C and D are axes of pivot or hinged attachment between the two parts and a constrainer; A and B are substantially at right angles; C and D are inclined at an angle somewhat less than 90°; A, B, C, D are all inclined relatively; A, B, C, D all, if produced, intersect at a point, F, in all positions of the structures. By "pivot" is meant, a rotatable connection including journal bearing, not involving axial sliding.

What I claim is:—

1. Interconnection means between parts of aircraft required to move relatively in relatively inclined planes, comprising four pivotal connections with their axes intersecting at a point, said connections affording freedom in rotation about their respective axes but not axial freedom thereon.

2. Interconnection means between parts of aircraft required to move relatively in relatively inclined planes, comprising an intermediate joint member, a first pivot joint between said member and one aircraft part, a second pivot joint between said member and the other aircraft part; a rigid constrainer, a third pivot joint between said constrainer and the first aircraft part and a fourth pivot joint between said constrainer and the second aircraft part, all four axes intersecting at a point, and each axis being inclined to all the others, and all said pivot joints comprising bearings permitting rotation about one axis but no axial movement thereon.

3. Interconnection means between parts of aircraft required to move relatively in relatively inclined planes, comprising an intermediate joint member, a first pivot joint between said member and one aircraft part, a second pivot joint between said member and the second aircraft part, the axes of these first and second joints intersecting at a substantial right-angle at a point; a rigid constrainer, a third pivot joint between the constrainer and the first aircraft part, and a fourth pivot joint between the constrainer and the second aircraft part, the axes of the third and fourth joints intersecting at the said point, one of the third and fourth axes being inclined substantially at right angles to both first and second axes, the other (of the third and fourth) being inclined to the alternative (of the third and fourth) at an angle substantially less than a right angle, said pivot joints comprising bearings permitting rotation about one axis but no axial movement thereon.

4. Interconnection for the folding wing of an aircraft, comprising an intermediate joint member, a first pivot joint connecting it to the aircraft with axis substantially spanwise directed, a second pivot joint between the wing and said member with second axis perpendicular to the first and intersecting same at a point; a rigid constrainer, a third pivot joint between the constrainer and the aircraft with its axis substantially perpendicular to the first and intersecting said point, and a fourth pivot joint between said constrainer and the wing, with its axis intersecting said point and inclined at an angle other than 90° to all the first three pivot axes, said pivot joints comprising bearings permitting rotation about one axis but no axial movement thereon.

5. Interconnection according to claim 3, of which the second and fourth pivot joints are joints to a spar of the wing.

6. Interconnection according to claim 3, in which the second and fourth pivot joints are to the front spar of the wing.

7. A folding-wing aircraft having wing interconnection according to claim 4.

8. A folding wing aircraft having wing interconnection according to claim 4 and having mating fittings at points spaced chordwise of the wing to receive locking-pins or equivalent fasteners when said wing is spread.

9. A folding wing aircraft having wing interconnection according to claim 4 and having mating fittings at points spaced chordwise of the wing to receive locking-pins or equivalent fasteners when said wing is spread, said fittings including parts which mate by substantially helical movement of the wing in being spread.

10. Interconnection between an angularly movable control surface part of an aircraft and a control operating part borne in fixed structure of said aircraft, comprising, a hinge between said fixed structure and the control surface with its axis inclined to that of said control operating part and intersecting same at a point; a fixed constrainer, a pivot connection between said control operating part and the constrainer, and a bearing forming a pivot connection between said constrainer and said control surface the axes of said pivot and said bearing being mutually inclined, and both inclined to the first and second axes, and also intersecting at said point.

11. Interconnection according to claim 10, in which the first part is a spindle and lever or equivalent supported in the aircraft structure and connected for pilots' control; and the fourth pivot connection is comprised by an offset spindle borne in the control surface.

12. Interconnection according to claim 10, in which the mechanism is comprised wholly within the thickness of a wing and the control surface which is hinged thereto.

13. Interconnection according to claim 10, in which the constrainer and first part are interconnected (about the third axis) by fork-like elements.

14. Interconnection for retractable undercarriages of aircraft in which it is required to rotate the plane of a wheel or equivalent during retractile movement about an axis inclined to that of retractile movement comprising a wheel supporting (second) part, a first part comprised by structure of the aircraft, an intermediate connecting member borne on a first axis by said first part and pivotally connected to said second part about a second axis intersecting said first axis at a point, a rigid constrainer pivotally connected to said first part about a third axis intersecting said point and inclined to said first and second axes, and pivotally connected to said second part about a fourth axis which again intersects said point and is inclined to the first, second, and third axes, the bearings and pivots having the four axes being such as to permit rotation about their respective axes but no relative movement thereon.

15. A retractable aircraft under-carriage having a connection according to claim 14, in which said second part is an undercarriage leg.

16. A retractable aircraft undercarriage having a connection according to claim 14, including further a jack connected pivotally to the aircraft and to a part of said undercarriage which moves in retraction.

17. A retractable aircraft undercarriage having a connection according to claim 14, including further a jack connected pivotally to the aircraft and to a part of said undercarriage which moves in retraction, said part being the constrainer.

18. A retractable aircraft undercarriage according to claim 14 in which said constrainer is virtually a plane frame for bracing the undercarriage when extended.

RICHARD JOHN HARRINGTON HUDSON.